ABRAHAM F. WOLF.
Improvement in Tea Kettles.
No. 121,071.  Patented Nov. 21, 1871.
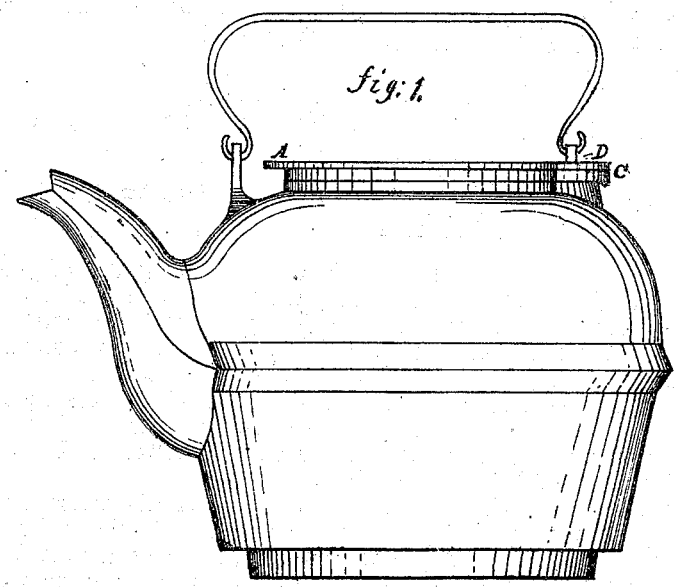
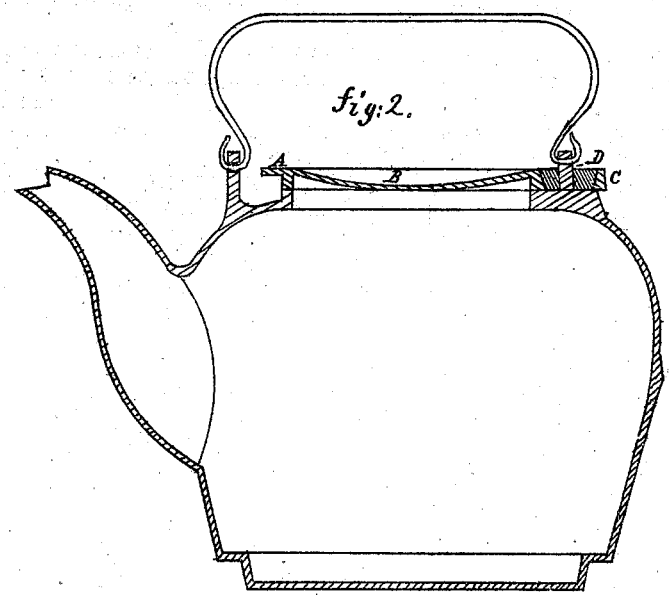
Witnesses.
Inventor,
Abraham F. Wolf
By I. I. Johnston & Bro, his attorneys

UNITED STATES PATENT OFFICE.

ABRAHAM F. WOLF, OF BEAVER FALLS, PENNSYLVANIA, ASSIGNOR TO A. F. WOLF & CO., OF SAME PLACE.

IMPROVEMENT IN TEA-KETTLES.

Specification forming part of Letters Patent No. 121,071, dated November 21, 1871.

*To all whom it may concern:*

Be it known that I, ABRAHAM F. WOLF, of Beaver Falls, in the county of Beaver and State of Pennsylvania, have invented a new and useful article of manufacture, viz., an Improved Lid for Tea-Kettles, of which the following is a specification:

The nature of my invention consists in casting a tea-kettle lid concave on its upper side and convex on its lower side, whereby I am enabled to make a true plane of that portion of the lid which rests on the top edge of the mouth of the tea-kettle and also obtain stiffness and strength in the lid, with the advantage of making the upper surface of the lid answer the purpose of a shelf for holding plates or other vessels used in cooking.

To enable others skilled in the art to make and use my new article of manufacture, I will describe more fully its construction.

In the accompanying drawing, Figure 1 is a side elevation of a tea-kettle provided with my improvement in the lid. Fig. 2 is a vertical section of the same.

In the accompanying drawing, A represents the lid, made concave, as shown at B, and provided with lug C, which is pivoted to the lug D on the body of the tea-kettle, so that the lid A may be moved sidewise.

I do not claim broadly a tea-kettle lid having its upper surface flat, for such device may be seen in the patent granted to Ezra Ripley, July 14, 1868.

By constructing the lid concave on its upper side, as shown at B, vessels used for cooking or other household use may be placed upon the lid A and be warmed or kept warm, which is often desirable while cooking.

Having thus described my new article of manufacture and its advantage, what I claim as of my invention is—

A concave lid for tea-kettles, constructed as herein described, and for the purpose set forth.

A. F. WOLF.

Witnesses:
   A. C. JOHNSTON,
   JAMES J. JOHNSTON. (154)